United States Patent
Penzes et al.

(10) Patent No.: US 9,312,862 B2
(45) Date of Patent: Apr. 12, 2016

(54) ADAPTIVE CLOCKING SCHEME TO ACCOMMODATE SUPPLY VOLTAGE TRANSIENTS

(75) Inventors: Paul Penzes, Irvine, CA (US); Mark Fullerton, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 718 days.

(21) Appl. No.: 13/331,874

(22) Filed: Dec. 20, 2011

(65) Prior Publication Data

US 2013/0047023 A1 Feb. 21, 2013

Related U.S. Application Data

(60) Provisional application No. 61/524,538, filed on Aug. 17, 2011.

(51) Int. Cl.

| | |
|---|---|
| G06F 1/04 | (2006.01) |
| H03L 7/08 | (2006.01) |
| H03K 3/03 | (2006.01) |
| H03K 3/037 | (2006.01) |
| H03K 19/01 | (2006.01) |
| G06F 12/14 | (2006.01) |
| G06F 21/44 | (2013.01) |
| H03K 5/13 | (2014.01) |
| H03L 7/097 | (2006.01) |

(Continued)

(52) U.S. Cl.
CPC ............ *H03L 7/0802* (2013.01); *G06F 1/32* (2013.01); *G06F 12/14* (2013.01); *G06F 21/44* (2013.01); *H03K 3/0315* (2013.01); *H03K 3/0375* (2013.01); *H03K 5/133* (2013.01); *H03K 19/01* (2013.01); *H03L 7/097* (2013.01); *H03L 7/0997* (2013.01); *G06F 1/26* (2013.01); *G06F 1/3203* (2013.01); *G06F 1/3228* (2013.01); *H01L 2924/0002* (2013.01); *H03K 2005/00026* (2013.01); *H03K 2005/00058* (2013.01)

(58) Field of Classification Search
USPC .......... 713/300, 310, 320, 322, 323, 400, 500
See application file for complete search history.

(56) References Cited

U.S. PATENT DOCUMENTS

| | | | | |
|---|---|---|---|---|
| 4,124,848 A | * | 11/1978 | Clark et al. .................... | 340/524 |
| 4,479,216 A | * | 10/1984 | Krambeck et al. ............ | 714/814 |

(Continued)

FOREIGN PATENT DOCUMENTS

| | | |
|---|---|---|
| WO | WO 2005/088424 A2 | 9/2005 |
| WO | WO 2010/058249 A1 | 5/2010 |

OTHER PUBLICATIONS

Ernst, D., et al., "Razor: A Low-Power Pipeline Based on Circuit-Level Timing Speculation," *Proceedings of the 36th International Symposium on Microarchitecture*, Institute of Electrical and Electronics Engineers, United States (2003).

(Continued)

*Primary Examiner* — Zahid Choudhury
(74) *Attorney, Agent, or Firm* — Sterne, Kessler, Goldstein & Fox PLLC

(57) ABSTRACT

Adaptive clocking schemes for synchronized on-chip functional blocks are provided. The clocking schemes enable synchronous clocking which can be adapted according to changes in signal path propagation delay due temperature, process, and voltage variations, for example. In embodiments, the clocking schemes allow for the capacity utilization of a logic path to be increased.

18 Claims, 8 Drawing Sheets

800

(51) Int. Cl.
*H03L 7/099* (2006.01)
*G06F 1/32* (2006.01)
*G06F 1/26* (2006.01)
*H03K 5/00* (2006.01)

(56) References Cited

U.S. PATENT DOCUMENTS

| | | | |
|---|---|---|---|
| 4,775,997 A | 10/1988 | West, Jr. et al. | |
| 5,526,360 A | 6/1996 | Kraft | |
| 5,550,514 A | 8/1996 | Liedberg | |
| 5,590,400 A | 12/1996 | Lopponen | |
| 5,873,039 A | 2/1999 | Najafi | |
| 6,194,940 B1 | 2/2001 | Hunter et al. | |
| 6,320,438 B1* | 11/2001 | Arcus | 327/175 |
| 6,452,364 B1 | 9/2002 | Saeki et al. | |
| 6,586,971 B1* | 7/2003 | Naffziger et al. | 327/41 |
| 6,658,237 B1 | 12/2003 | Rozenblit et al. | |
| 6,782,486 B1 | 8/2004 | Miranda et al. | |
| 6,931,562 B2 | 8/2005 | Radjassamy | |
| 6,934,215 B2 | 8/2005 | Chung et al. | |
| 6,977,979 B1 | 12/2005 | Hartwell et al. | |
| 6,995,621 B1 | 2/2006 | Culler | |
| 7,129,763 B1 | 10/2006 | Bennett et al. | |
| 7,184,511 B2 | 2/2007 | Younis et al. | |
| 7,219,175 B1 | 5/2007 | Davis et al. | |
| 7,242,733 B2 | 7/2007 | Iwata | |
| 7,505,541 B1 | 3/2009 | Brunn et al. | |
| 7,642,825 B2 | 1/2010 | Maeda | |
| 7,716,511 B2* | 5/2010 | Jarrar et al. | 713/401 |
| 7,761,268 B2* | 7/2010 | Lin | 703/4 |
| 7,813,459 B2 | 10/2010 | Hasan et al. | |
| 7,902,654 B2 | 3/2011 | Choa-Eoan et al. | |
| 8,050,375 B2 | 11/2011 | Staszewski et al. | |
| 8,069,363 B2 | 11/2011 | Roth et al. | |
| 8,095,813 B2 | 1/2012 | Pernia et al. | |
| 8,129,953 B2 | 3/2012 | Pagano | |
| 8,134,411 B2 | 3/2012 | Shi et al. | |
| 8,145,670 B2 | 3/2012 | Yasaki et al. | |
| 8,175,545 B2 | 5/2012 | Rofougaran | |
| 8,175,548 B2 | 5/2012 | O'Keeffe et al. | |
| 8,176,352 B2 | 5/2012 | Gillespie et al. | |
| 8,183,899 B2 | 5/2012 | Kanno et al. | |
| 8,198,868 B2 | 6/2012 | Pagano | |
| 8,306,174 B2 | 11/2012 | Murphy et al. | |
| 8,331,898 B2 | 12/2012 | Waters et al. | |
| 8,477,631 B2 | 7/2013 | Ramakrishnan et al. | |
| 8,810,300 B2 | 8/2014 | Sippel | |
| 8,823,447 B2 | 9/2014 | Gelman | |
| 8,954,017 B2 | 2/2015 | Kothari et al. | |
| 2002/0135343 A1 | 9/2002 | Underbrink et al. | |
| 2004/0098630 A1* | 5/2004 | Masleid | 713/320 |
| 2004/0130357 A1 | 7/2004 | Smith | |
| 2005/0017676 A1 | 1/2005 | Takimoto et al. | |
| 2006/0049886 A1 | 3/2006 | Agostinelli, Jr. et al. | |
| 2007/0096775 A1 | 5/2007 | Elgebaly et al. | |
| 2007/0132523 A1 | 6/2007 | Newman | |
| 2008/0068100 A1 | 3/2008 | Goodnow et al. | |
| 2008/0122405 A1 | 5/2008 | Fujikura | |
| 2008/0204158 A1 | 8/2008 | Weder | |
| 2008/0320292 A1* | 12/2008 | Croxford et al. | 713/1 |
| 2009/0116578 A1 | 5/2009 | Sperlich et al. | |
| 2010/0145895 A1* | 6/2010 | Narendra et al. | 706/12 |
| 2010/0194400 A1 | 8/2010 | Baumann et al. | |
| 2011/0140752 A1 | 6/2011 | Garg et al. | |
| 2011/0181315 A1 | 7/2011 | Krishnan | |
| 2011/0199159 A1* | 8/2011 | Rozen et al. | 331/74 |
| 2011/0215827 A1 | 9/2011 | Mohammad et al. | |
| 2013/0044844 A1 | 2/2013 | Kothari et al. | |
| 2013/0283069 A1 | 10/2013 | Matsuda | |
| 2014/0312947 A1 | 10/2014 | Sippel | |

OTHER PUBLICATIONS

International Search Report and Written Opinion of the International Searching Authority directed to related International Patent Application No. PCT/US2012/051479, mailed Oct. 26, 2012, from the International Searching Authority, European Patent Office, Netherlands 16 pages.

International Search Report and Written Opinion of the International Searching Authority directed to related International Patent Application No. PCT/US2012/051451, mailed Nov. 22, 2012, from the International Searching Authority, European Patent Office, Netherlands 16 pages.

Fischer, Tim et al., "A 90nm Variable Frequency Clock System for a Power-Managed Itanium Architecture Processor," IEEE Journal of Solid-State Circuits, vol. 41, No. 1, Jan. 2006, 11 pages.

International Preliminary Report on Patentability, directed to related International Patent Application No. PCT/US2012/051451, mailed Feb. 27, 2014; 13 pages.

* cited by examiner

ADAPTIVE CLOCKING SCHEME TO ACCOMMODATE SUPPLY VOLTAGE TRANSIENTS

CROSS-REFERENCE TO RELATED APPLICATION(S)

This patent application claims the benefit of U.S. Provisional Patent Application No. 61/524,538, filed Aug. 17, 2011, entitled "Power Management Unit," which is incorporated herein by reference in its entirety.

BACKGROUND

1. Field of the Invention

The present invention relates generally to data clocking in an integrated circuit (IC).

2. Background Art

Power consumption of an integrated circuit (IC) can vary dramatically based on active functions on it. In order to minimize power consumption, functions are started and stopped as needed. This however leads to large changes in the load current. Large load steps, in turn, cause dynamic voltage variations in the supply voltage provided to the IC.

Much of the supply voltage variations are typically transient (e.g., less than 50 ns). In fact, the average supply voltage (over a 500 ns time window, for example) is fairly constant. In addition, worst-case voltage transients are extremely infrequent. Conventionally, however, the maximum clock frequency of the IC is selected based on the worst case voltage level. As such, although most of the time the voltage provided to the IC can support a higher clock frequency, the clock frequency is still constrained to accommodate the worst-case voltage transients.

Accordingly, there is a need for adaptive clock schemes that accommodate voltage transients.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Embodiments of the present invention provide systems and methods for dynamically regulating the clock frequency of an integrated circuit (IC) based on the supply voltage provided to the IC. By doing so, the clock frequency is no longer constrained by a worst-case voltage level (typically, corresponding to worst-case voltage transients), and a higher overall clock frequency can be supported.

Figure 1:
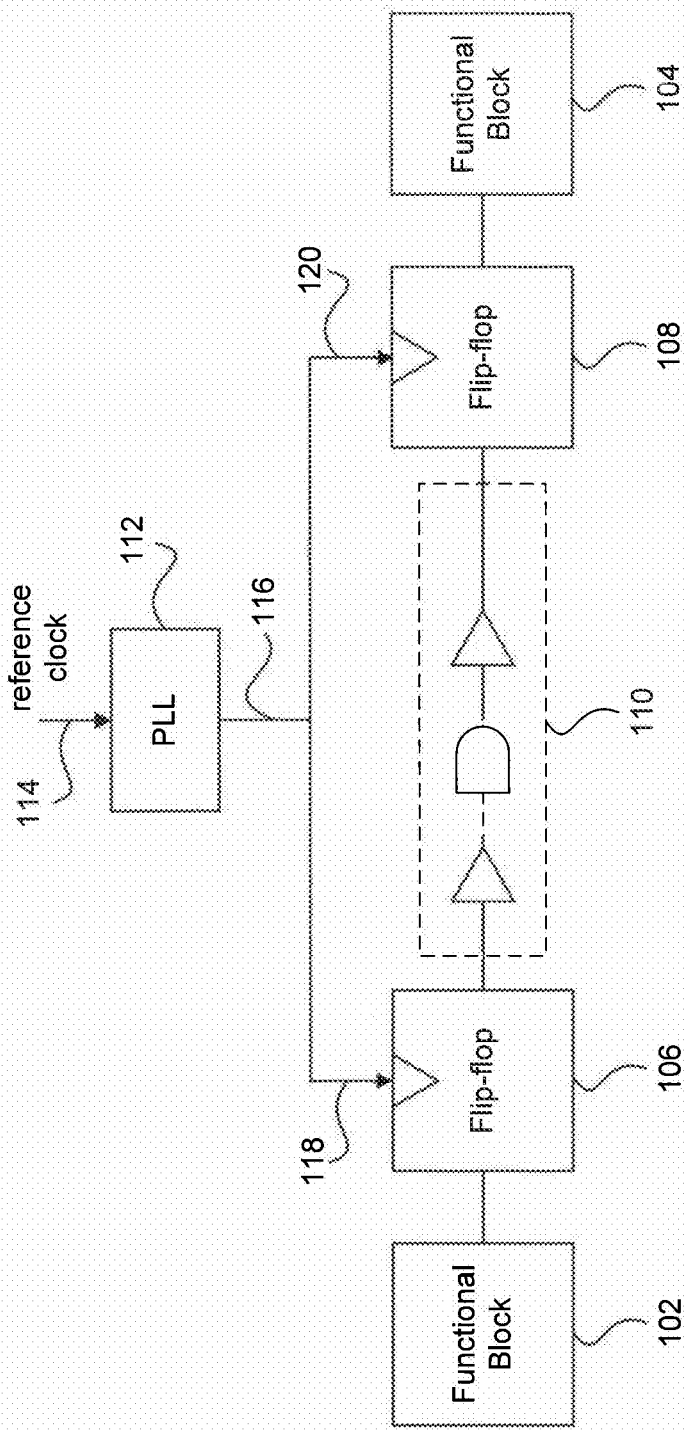
FIG. 1 illustrates a conventional synchronous clocking scheme.

FIG. 1 illustrates a conventional synchronous clocking scheme used to synchronize functional blocks of an example system 100. As shown in FIG. 1, example system 100 includes a first functional block 102, a second functional block 104, a flip-flop or latch circuit 106, a flip-flop or latch circuit 108, a logic path 110 (which may include elements such as amplifiers, inverters, AND gates, NOR gates, etc.), and a phase-locked loop (PLL) 112. Example system 100 may be implemented in an integrated circuit (IC). For example, example system 100 may be a System-on-Chip (SoC).

PLL 112 generates a system clock 116 based on a reference clock 114. The operation of a PLL to generate a clock based on a reference clock is well known in the art and will not be described herein. Reference clock 116 is distributed to different parts of example system 100. For example, as shown in FIG. 1, reference clock 116 is distributed to flip-flops 106 and 108 as clock signals 118 and 120, respectively.

Functional blocks 102 and 104 communicate data via logic path 110. To enable data transmission from functional block 102 to functional block 104, flip-flop 106 samples an output of functional block 102 according to clock signal 118 to send a data value over logic path 110. At the receiving end of logic path 110, flip-flop 108 samples logic path 110 according to clock signal 120 to receive the data value and provide the data value to functional block 104.

In order for the data value sent by functional block 102 to be properly received by functional block 104, flip-flop 120 must sample logic path 110 at an appropriate time (i.e., when the data value has reached the other end of logic path 110). As noted above, flip-flops 118 and 120 are clocked according to clock signals 118 and 120, which are derived from system clock 116. As such, by relating the time period of system clock 116 to the propagation delay of logic path 110 (e.g., selecting the frequency of system clock 116 such that the propagation delay of logic path 110 is equal to the time period of system clock 116), flip-flops 118 and 120 can be synchronized to send and receive data.

Ideally, any timing variations between clock signals 118 and 120 must be negligible. In practice, however, routing delays from PLL 112 to flip-flops 118 and 120 may introduce timing variations between clock signals 118 and 120, which must be accounted for. This problem becomes more significant when the frequency of system clock 116 is increased to enable faster data transmission from functional block 102 to functional block 104.

Figure 2:
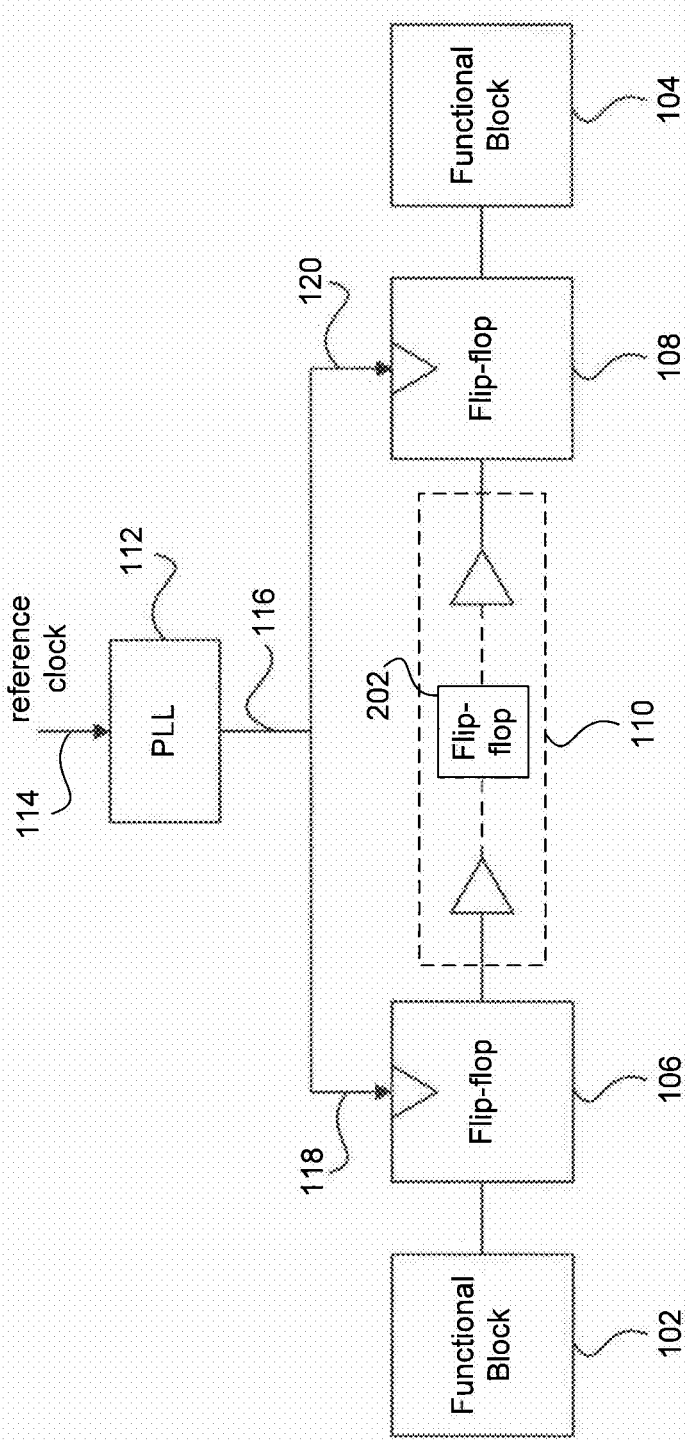
FIG. 2 illustrates another conventional synchronous clocking scheme.

The above described synchronous clocking scheme also suffers from another problem when higher data rates are required between functional blocks 102 and 104. To enable higher data rates, multiple data values need to be sent over logic path 110 at the same time (i.e., the capacity of logic path 110 must be increased). For example, a data value is sent by functional block 102 before a previous data value is received by functional block 104. To allow for multiple data values to be present over logic path 110, one or more data holding stages (e.g., flip-flops or latch circuits) must be added in logic path 110. This is illustrated, for example, in FIG. 2, which shows a flip-flop 202 added in logic path 110. Flip-flop 202 allows for two data values to traverse logic path 110 at the same time. For example, while a first data value is output by flip-flop 202 in the direction of flip-flop 108, a second data value is output by flip-flop 106 in the direction of flip-flop 202. As more data holding stages are added in logic path 110, the propagation delay of logic path 110 will have an increased variance (e.g., due to timing variations in the various data holding stages, jitter, etc.), which introduces an unpredictable clock skew between the data signal (at the input of flip-flop 108) and clock signal 120. As such, data values transmitted from functional block 102 may be lost.

For the reasons described above, conventional synchronous clocking schemes are less desirable for use in applications requiring very high data rates. In addition, conventional synchronous clocking schemes do not account for temperature, process, and voltage variations, which can introduce further clock skew in the system.

Figure 3:
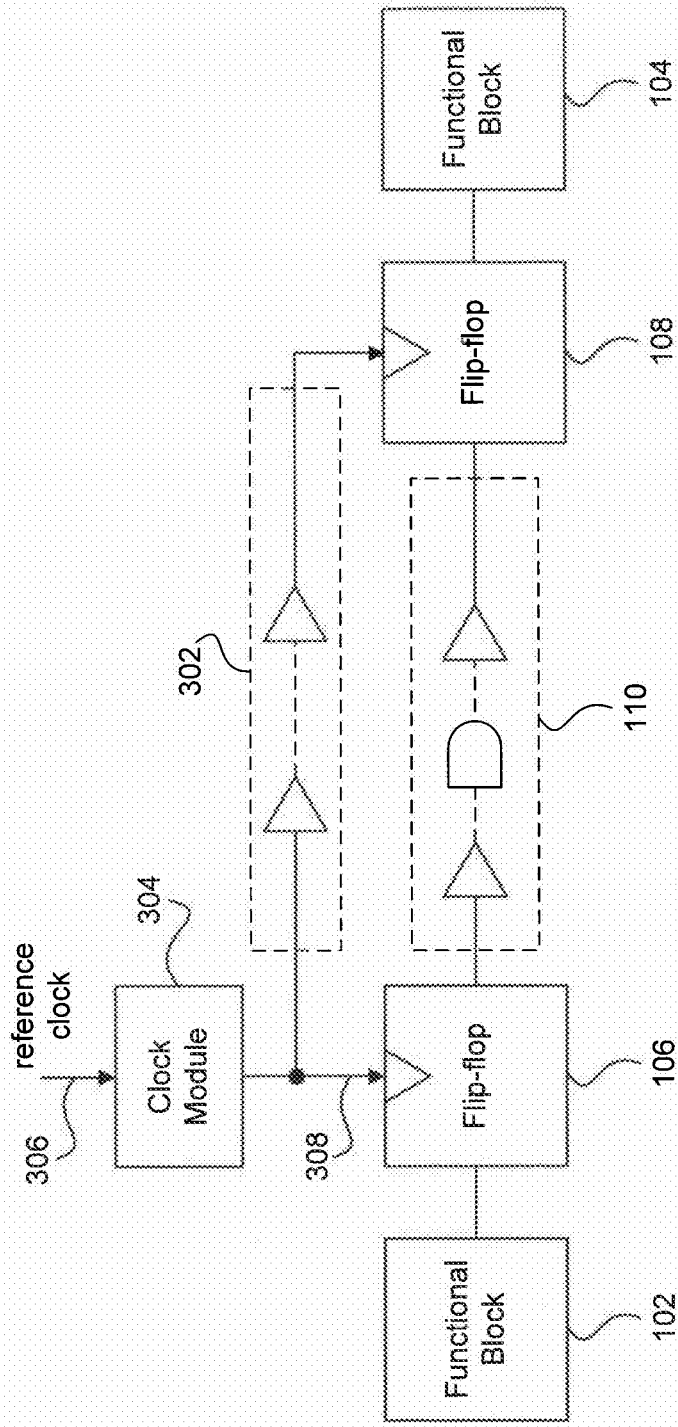
FIG. 3 illustrates an example clocking scheme according to an embodiment of the present invention.

FIGS. 3-6 illustrate one approach for regulating the IC clock frequency based on variations of the supply voltage provided to the IC, while at the same time attempting to maximize the capacity utilization of logic paths. The approach relies on a delay line that is exposed to the same voltage component as the rest of the IC logic. Supply voltage variations result in delay variations in the delay line, which, in turn, can be used to regulate the clock frequency provided to the IC. In an embodiment, the delay variations are provided using a feedback path to a voltage controlled oscillator (VCO) used to generate the clock frequency. In another embodiment, the delay line and at least one inverter form a ring oscillator that directly generates the clock frequency. FIG. 3 illustrates an example clocking scheme according to an embodiment of the present invention. The example clocking scheme is described with respect to an example system 300. Like example system 100, example system 300 includes first functional block 102, second functional block 104, flip-flop 106, flip-flop 108, and logic path 110. Furthermore, example system 300 includes a clock module 304 and a clock path 302. Example system 300 may be implemented in an integrated circuit (IC). For example, example system 300 may be a System-on-Chip (SoC).

Clock module 304 generates a system clock 308 based on a reference clock 306. Clock module 304 may include a PLL or a frequency synthesizer. In an embodiment, clock module 304 includes a voltage controlled oscillator (VCO), implemented using a ring oscillator.

Clock module 304 provides system clock 308 to flip-flop 106, which samples an output of functional block 102 according to system clock 308 to send a data value over logic path 110. In addition, system clock 308 is sent to flip-flop 108 over clock path 302. In an embodiment, clock path 302 is adapted to have substantially similar propagation delay as logic path 110. As such, when a data value and system clock 308 are transmitted concurrently over logic path 110 and clock path 302, respectively, the data value and system clock 308 reach flip-flop 108 within an appropriate window (setup) of one another such that flip-flop 108 samples the data value, when the data has settled, using the received system clock 308.

Both the transmitted data and system clock 308 experience timing variations over logic path 110 and clock path 302, respectively. For example, the times at which the data and system clock 308 reach flip-flop 108 may vary. However, so long that a system margin separates the earliest possible clock time (i.e., the earliest time that system clock 308 may reach flip-flop 108) from the latest possible data time (i.e., the latest time that a previous data value may reach flip-flop 108) and the latest possible clock time (i.e., the latest time that system clock 308 may reach flip-flop 108) from the earliest possible data time (i.e., the earliest time that a subsequent data value may reach flip-flop 108), the clocking scheme described in FIG. 3 can support data transfer without data loss. Complications may arise, however, because the system margin varies over different process, temperature, and voltage conditions, which makes predicting the maximum data rate that can be supported quite complicated. To avoid data loss, therefore, the system is designed to have a maximum data rate according to a worst case margin, thereby resulting in a sub-optimal data rate.

Figure 4:
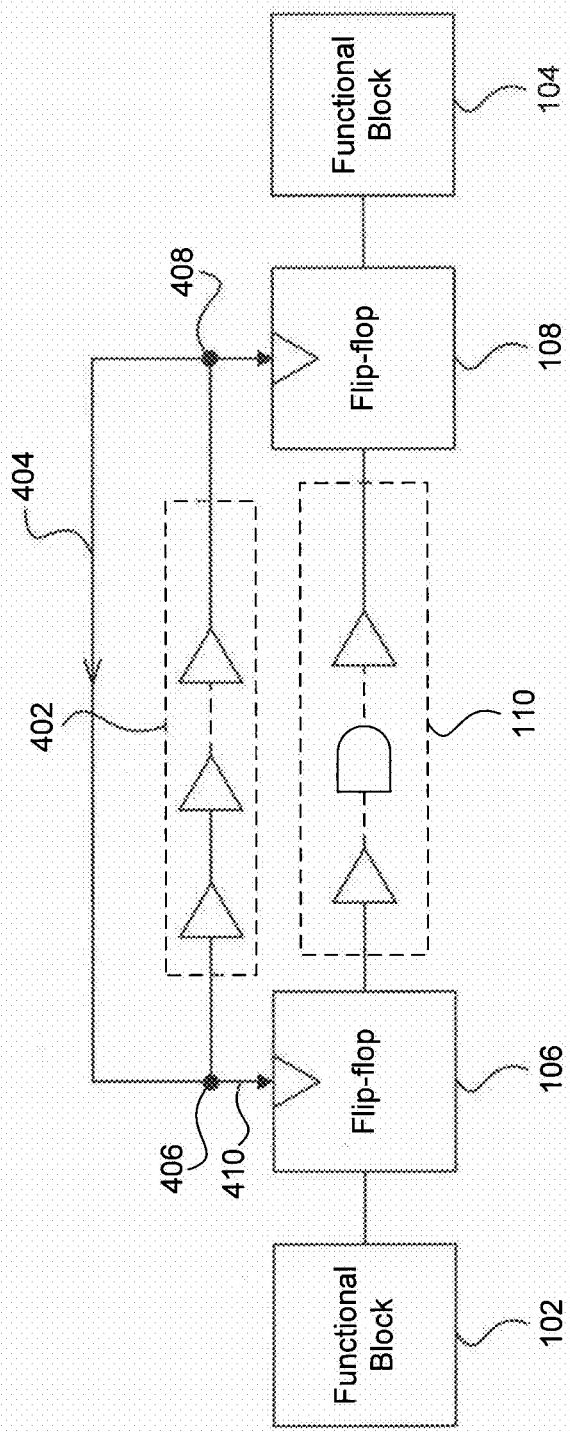
FIG. 4 illustrates another example clocking scheme according to an embodiment of the present invention.

FIG. 4 illustrates another example clocking scheme according to an embodiment of the present invention. The example clocking scheme is described with respect to an example system 400. Like example system 100, example system 400 includes first functional block 102, second functional block 104, flip-flop 106, flip-flop 108, and logic path 110. Furthermore, example system 400 includes a clock path 402 and a feedback path 404. Example system 400 may be implemented in an integrated circuit (IC). For example, example system 400 may be a System-on-Chip (SoC). In an embodiment, logic path 110 is the critical path of the IC, having the largest delay of all logic paths of the IC.

As shown in FIG. 4, clock path 402 has two endpoints 406 and 408, which couple clock path 402 to flip-flops 106 and 108, respectively. Flip-flop 106 is controlled by a clock signal 410. Clock signal 410 is also sent over clock path 402 to flip-flop 108. According to embodiments, clock path 402 is adapted to have substantially similar propagation delay as logic path 110. As such, when a data value and clock signal 410 are transmitted concurrently over logic path 110 and clock path 402, respectively, the data value and clock signal 410 reach flip-top 108 within an appropriate window (setup) of one another such that flip-flop 108 samples the data value, when the data has settled, using the received clock signal 410.

Feedback path 404 couples endpoints 408 and 406 of clock path 402. As such, feedback path 404 serves to provide feedback information regarding the actual propagation delay of clock path 402. Because clock path 402 is adapted to have substantially similar propagation delay as logic path 110, feedback path 404 also provides feedback information regarding the propagation delay of logic path 110. Further, because clock path 402 is exposed to the same supply voltage as logic path 110, supply voltage variations will cause substantially similar delay variations in clock path 402 as in logic path 110. These delay variations are reflected by feedback path 404, and automatically by clock signal 410. Accordingly, supply voltage variations are automatically reflected in clock frequency variations. As the supply voltage increases/decreases, the delay of clock path 402 decreases/increases, leading to an increase/decrease in the frequency of clock signal 410.

In an embodiment, together with clock path 402, feedback path 404 forms a ring oscillator whose output frequency (e.g., the output frequency of clock signal 410) is a function of the actual propagation delay of clock path 402 (or the propagation delay of logic path 110). In an embodiment, the ring oscillator is implemented using an odd number of inverters coupled in series. Accordingly, feedback path 404 and clock path 402 enable an automatic self-correcting mechanism for adjusting the data rate between functional block 102 and functional block 104, as a function of the propagation delay of logic path 110.

In an embodiment, rather than spreading clock path 402 between flip-flops 106 and 108, as shown in FIG. 4, clock path 402 is moved inside of a clock module, such as a PLL, which adjusts its output clock phase and frequency based on the feedback provided by feedback path 404.

Figure 5:
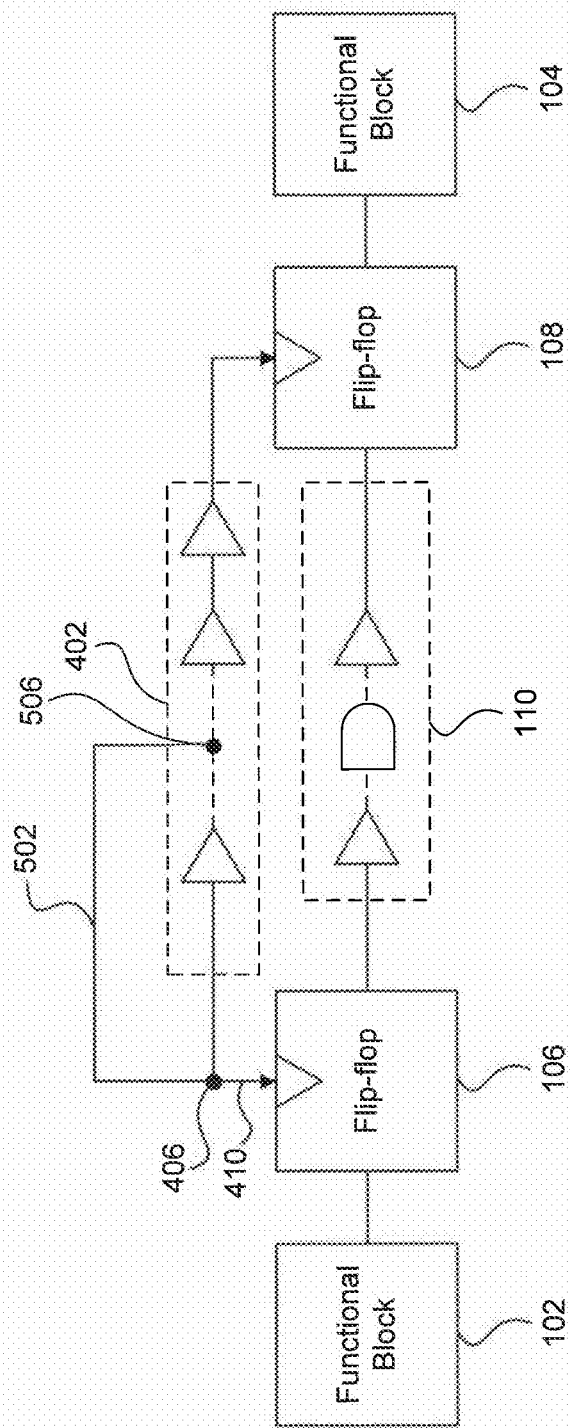
FIG. 5 illustrates another example clocking scheme according to an embodiment of the present invention.

FIG. 5 illustrates another example clocking scheme according to an embodiment of the present invention. The example clocking scheme is described with respect to an example system 500, which is similar to example system 400. Like example system 400, example system 500 includes first functional block 102, second functional block 104, flip-flop 106, flip-flop 108, logic path 110, and clock path 402. Example system 500 may be implemented in an integrated circuit (IC). For example, example system 500 may be a System-on-Chip (SoC). In an embodiment, logic path 110 is the critical path of the IC, having the largest delay of all logic paths of the IC.

Example system 500 improves on example system 400 by allowing for the data rate between functional block 102 and functional block 104 (in addition to being automatically adjusted based on the propagation delay of logic path 110) to be set so as to increase the capacity utilization of logic path 110.

As shown in FIG. 5, instead of using a feedback path 404 from endpoint 408 of clock path 402 like example system 400, system 500 uses a feedback path 502 from a tap point 506 of clock path 402 (as used herein, the term "tap point" refers to a point along clock path 402 that is not an endpoint). In an embodiment, tap point 506 is selected so that timing variations between the data signal and the clock signal do not result in data loss at flip-flop 108. Timing variations between the data signal and the clock signal include propagation delay variations between logic path 110 and clock path 402 (which are a function of the characteristics of each of the paths as well temperature, process, and voltage).

Figure 6:
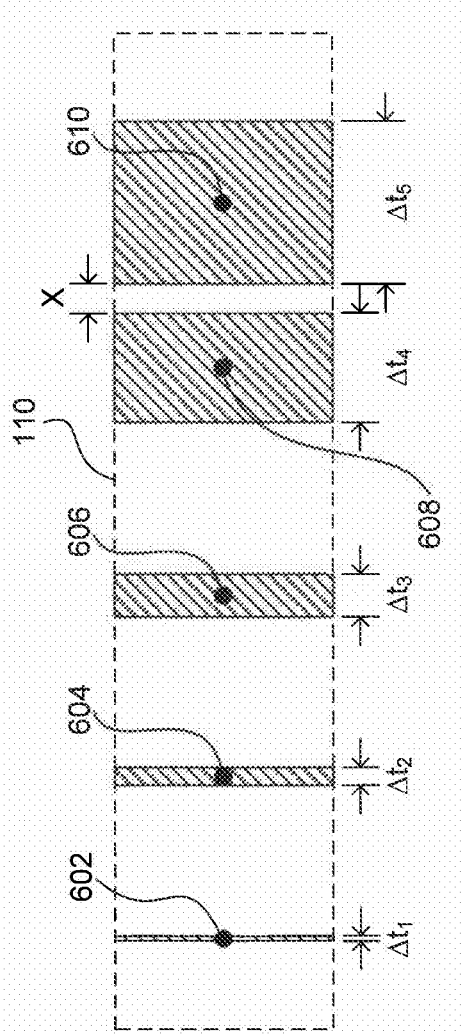
FIG. 6 is an example that illustrates timing variations of data traversing a logic path.

FIG. 6 is an example 600 that illustrates timing variations between the data signal and the clock signal in an example system, such as system 500, for example. In particular, example 600 shows a logic path 110 having a plurality of data holding stages 602, 604, 606, 608 and 610. The example system, like system 500 for example, also has a clock path (not shown in FIG. 6) adapted to have a substantially similar propagation delay as logic path 110. The clock signal is transmitted over the clock path and is used to clock the data signal at each holding stage.

Both the data signal and the clock signal have timing variations at each holding stage, such that both the data signal and the clock signal can reach the holding stage earlier or later than a reference time. Assuming that the reference time is given by the clock signal (even though the clock typically varies), the timing variation of the data signal relative to the clock signal can be illustrated as shown in FIG. 6. At each holding stage, the data signal may vary within a time interval "Δt" relative to the clock signal (the data may be early or late relative to the clock) in FIG. 6.

As the data signal traverses logic path 110 (and the clock signal simultaneously traverses the clock path), the maximum relative variation between the data and the clock increases, as propagation delay variations between logic path 110 and the clock path (e.g., due to timing variations in holding stages, metal delay, jitter, etc.) tend to accumulate. Thus, as shown in FIG. 6, the time intervals "Δt" become wider as the data traverses logic path 110.

To avoid data loss, a margin (shown as "X" in FIG. 6) must be maintained between the time intervals, typically, of the last two holding stages. The value of the system margin "X" is dependent on timing variations that are inherent in the system (e.g., timing variations due logic path 110 and the clock path) and the data rate at which data is being transmitted over logic path 110. Further, the margin "X" varies with temperature, process, and voltage variations. As the data rate is increased, the margin "X" decreases.

Referring back to FIG. 5, in an embodiment, tap point 506 is selected so that the margin "X" remains sufficiently high that data loss is not incurred. This entails selecting tap point 506 to be sufficiently distant from end point 406 along clock path 402, that the data rate does not exceed the capacity of logic path 110 and eliminate the margin "X." For example, at design time, a minimum distance between end point 406 and tap 506 can be determined. Tap point 506 is selected to be at least that minimum distance away from end point 406 along clock path 402. At the same time, tap point 506 is selected so that the capacity utilization of logic path 110 is increased. This implies selecting tap point 506 as close as possible to end point 406, without violating the minimum distance requirement, so as to increase the transmission data rate.

Figure 7:
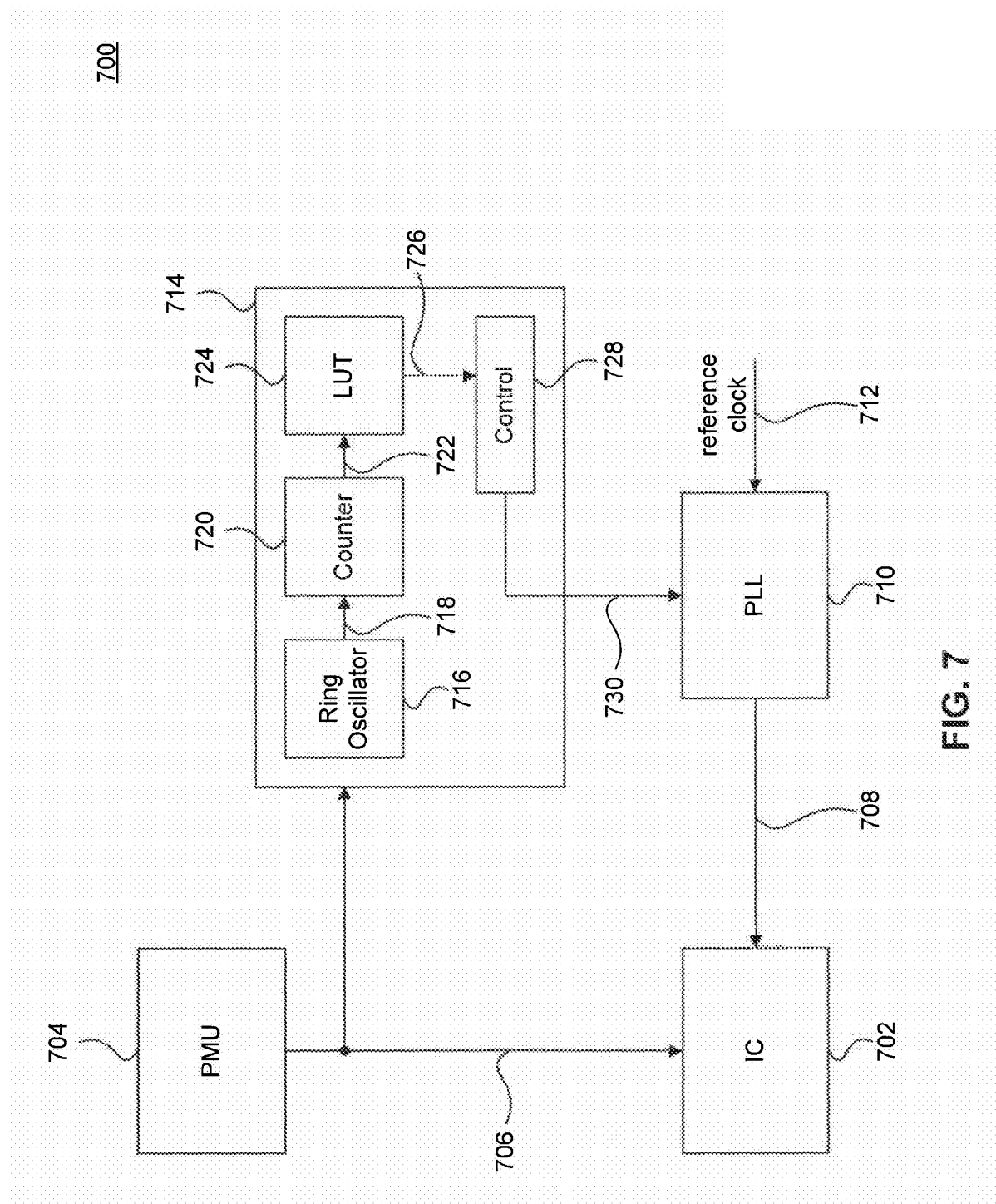
FIG. 7 illustrates another example embodiment of the present invention.

FIG. 7 illustrates another approach for regulating the clock frequency provided to the IC based on supply voltage variations. In particular, FIG. 7 illustrates an example system 700 according to an embodiment of the present invention. As shown in FIG. 7, example system includes a power management unit (PMU) 704, an integrated circuit (IC) 702, a phase locked loop (PLL) 710, and a clock regulating module 714. IC 702 may be a processor chip, for example.

PMU 704 provides a supply voltage 706 to IC 702. Supply voltage 706 is also provided to clock regulating module 714. IC 702 also receives a clock 708 from PLL 710. PLL 710 generates clock signal 708 based on a reference clock 712.

Clock regulating module 714 acts a "supply voltage watchdog" that measures/estimates the supply voltage over a predetermined time period (e.g., 1000 cycles) and that controls PLL 710 accordingly. In an embodiment, the predetermined time period is selected to be small compared to a known period of the supply voltage (typically, the PMU output has a slow periodic sinusoidal component which frequency can be determined). In an embodiment, as shown in FIG. 7, clock regulating module 714 includes a ring oscillator 716, a counter 720, a lookup table (LUT) 724, and a control module 728.

Ring oscillator 716 produces an oscillating output signal 718. The frequency of output signal 718 is affected by supply voltage 706 used to power ring oscillator 716. Specifically, the frequency of output signal 718 varies directly proportionally with supply voltage 706. As such, output signal 718 can be used to infer the average of supply voltage 706 over a time period.

In example system 700, a counter 720 receives output signal 718 from ring oscillator 716 and periodically outputs a signal 722, representative of the number of times that ring oscillator 716 has spun during the time period (or the speed of the ring oscillator). Signal 722 is then used by LUT 724 to retrieve a voltage value 726, indicative of the average supply voltage provided to ring oscillator 716 during the same time period. In an embodiment, LUT 724 is generated by a priori characterization of ring oscillator 716.

Control module 728 uses voltage value 726 to determine a new clock frequency for IC 702, and sends a control signal 730, determined based on the new clock frequency, to PLL 710. In an embodiment, the new clock frequency is determined using another lookup table that provides the maximum supported clock frequency as a function of voltage. Control signal 730 modulates clock signal 708 to adjust its frequency to the new clock frequency. Control signal 730 may control different components of PLL 710 to modulate clock signal 708, including, for example, controlling the voltage controlled oscillator (VCO) or the feedback loop of PLL 710.

Figure 8:
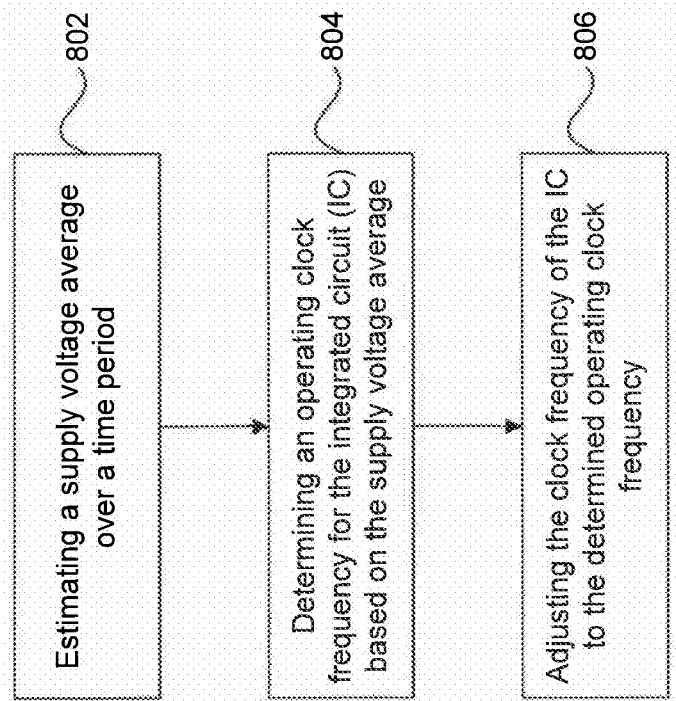
FIG. 8 is a process flowchart of a method for regulating a clock frequency of an integrated circuit (IC) according to an embodiment of the present invention.

FIG. 8 is a process flowchart 800 of a method of regulating the clock frequency of an integrated circuit (IC) according to an embodiment of the present invention.

As shown in FIG. 8, process 800 begins in step 802, which includes estimating a supply voltage average over a time period. In an embodiment, step 802 is performed by determining the average speed of a ring oscillator (which is provided the same supply voltage as the IC) over the time period, and using the determined average speed of the ring oscillator to infer the supply voltage average over the same time period.

Thus, in an embodiment, step 802 further includes determining, based on an output of a ring oscillator, a number representative of an average speed of the ring oscillator over the time period; and mapping the determined number using to a supply voltage average. In an embodiment, determining the average speed of the ring oscillator is done using a counter, which is coupled to the output of the ring oscillator. The counter counts the number of times that the ring oscillator has spun over the time period and outputs a number representative of the speed of the ring oscillator. Mapping the determined number to the supply voltage average is performed, in an embodiment, using a lookup table. The lookup table may be generated by a priori characterization of the ring oscillator. For example, the ring oscillator may be operated at various supply voltage values and its speed measured and stored in the lookup table.

Process 800 continues at step 804, which includes determining an operating clock frequency for the IC based on the supply voltage average. In an embodiment, the determined operating clock frequency is the maximum frequency supported by the IC based on the supply voltage average. In an embodiment, a second lookup table is used to map the supply voltage average to an operating clock frequency for the IC.

Finally, process 800 terminates in step 806, which includes adjusting the clock frequency of the IC to the determined operating clock frequency. Step 806 may be performed using any of the means for adjusting the clock frequency, as described above, or as known in the art. Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A system, comprising:
    a first functional block;
    a first latch circuit, coupled to an output of the first functional block;
    a second functional block;
    a second latch circuit, coupled to an input of the second functional block;
    a logic path that couples a data output of the first latch circuit and a data input of the second latch circuit;
    a clock path coupled at a first endpoint to a clock input of the first latch circuit and at a second endpoint to a clock input of the second latch circuit; and
    a feedback path, coupled between a tap point of the clock path and the first endpoint of the clock path,
    wherein the first latch circuit is configured to receive a system clock at its clock input and to sample the output of the first functional block according to the system clock, to send data clocked according to the system clock over the logic path,
    wherein the second latch circuit is configured to receive the system clock at its clock input and to sample its data input according to the system clock, to receive the data from the logic path; and
    wherein the clock path and the feedback path are configured to receive a same supply voltage as the logic path.

2. The system of claim 1, further comprising:
    a clock module configured to generate the system clock and to provide the system clock to the first latch circuit.

3. The system of claim 2, wherein the clock module is configured to send the system clock over the clock path to the second latch circuit.

4. The system of claim 1, wherein the clock path and the feedback path form a ring oscillator circuit.

5. The system of claim 4, wherein an output frequency of the ring oscillator is a function of a propagation delay of the clock path.

6. The system of claim 5, wherein the output frequency of the ring oscillator is proportional to a propagation delay of a fraction of the clock path.

7. The system of claim 5, wherein the output frequency of the ring oscillator is configured to vary according to changes in supply voltage, thereby adjusting a frequency of the system clock based on supply voltage variations.

8. The system of claim 1, wherein a frequency of the system clock is configured to be a function of a propagation delay of the clock path.

9. The system of claim 8, wherein the propagation delay of the clock path is configured to be equal to a propagation delay of the logic path.

10. The system of claim 8, wherein the frequency of the system clock is configured to vary according to temperature, process, and voltage variations of the propagation delay of the clock path.

11. The system of claim 1, wherein the tap point is configured to be at least a minimum distance away from the first endpoint along the clock path so that the data sent over the logic path does not exceed a capacity of the logic path.

12. The system of claim 1, wherein the clock path is inside a phase-locked loop (PLL).

13. A method for regulating a clock frequency of an integrated circuit (IC), comprising:
    estimating a supply voltage average over a time period by:
        determining, based on an output of a ring oscillator, a number representative of an average speed of the ring oscillator over the time period; and
        mapping the determined number to the supply voltage average;
    determining an operating clock frequency for the IC based on the supply voltage average over the time period; and adjusting the clock frequency of the IC to the determined operating clock frequency.

14. The method of claim 13, wherein determining the number representative of the average speed comprises coupling the output of the ring oscillator to a counter.

15. The method of claim 13, wherein mapping the determined number to the supply voltage average is performed using a lookup table, generated by a prior characterization of the ring oscillator.

16. The method of claim 13, wherein the ring oscillator is provided a same supply voltage as the IC.

17. The method of claim 13, wherein the determined operating clock frequency is the maximum frequency supported by the IC based on the supply voltage average.

18. A system for regulating a clock frequency of an integrated circuit (IC), comprising:
   a ring oscillator configured to receive a same supply voltage as the IC;
   a counter, coupled to an output of the ring oscillator, configured to determine a number representative of an average speed of the ring oscillator over a time period;
   a first lookup table, coupled to the counter, configured to map the determined number to a supply voltage average;
   a second lookup table configured to map the supply voltage average to an operating clock frequency for the IC; and
   means for adjusting the clock frequency of the IC to the operating clock frequency.

* * * * *